L. F. ADT.
EYEGLASS MOUNTING.
APPLICATION FILED NOV. 24, 1905.
967,292.
Patented Aug. 16, 1910.
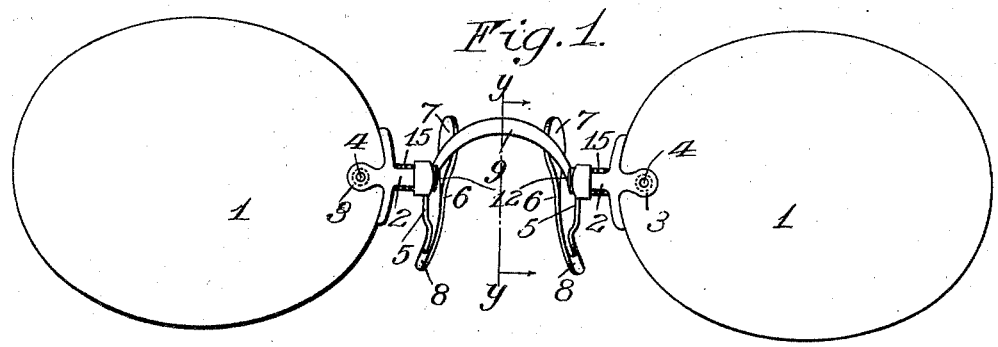
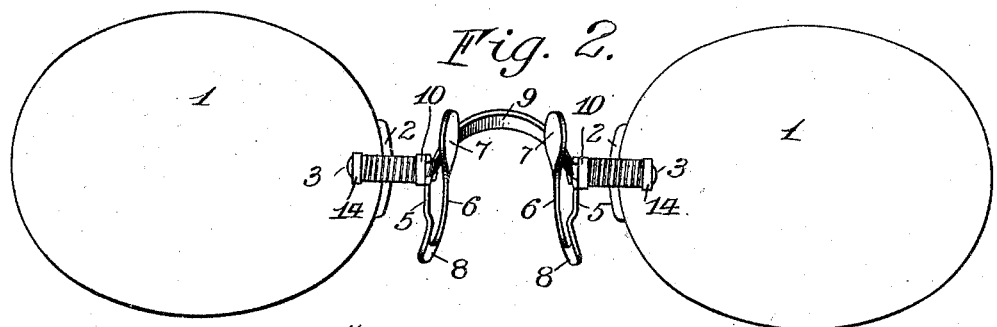
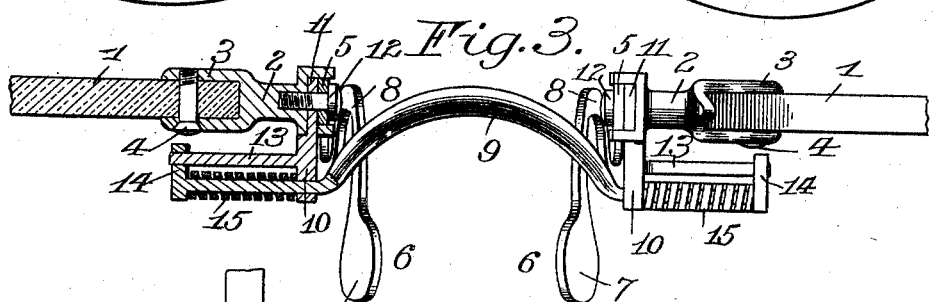
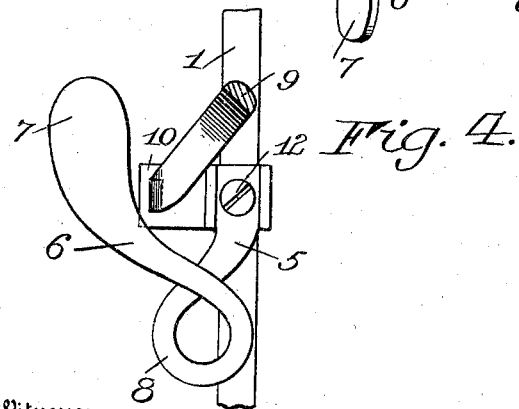

UNITED STATES PATENT OFFICE.

LEO F. ADT, OF ALBANY, NEW YORK.

EYEGLASS-MOUNTING.

967,292.  Specification of Letters Patent.  Patented Aug. 16, 1910.

Application filed November 24, 1905. Serial No. 288,835.

*To all whom it may concern:*

Be it known that I, LEO F. ADT, of Albany, in the county of Albany and State of New York, have invented certain new and useful Improvements in Eyeglass-Mountings; and I do hereby declare the following to be a full, clear, and exact description of the same, reference being had to the accompanying drawings, forming a part of this specification, and to the reference-numerals marked thereon.

My present invention relates to eyeglass mountings, and particularly to that class in which the nose guards are connected to the lenses and the latter connected to the bridge in such manner that the nose guards are separated for application to the nose of the wearer by a movement of the lenses in a horizontal direction, or one parallel or substantially co-incident with the major axis of the usual oval-shaped lenses, and it has for its object to provide a device which is primarily adapted to maintain the lenses in proper relative position to each other and to the eyes of the wearer under all conditions, so that cylindrical lenses for correction of astigmatism may be safely employed, even when the amount of astigmatism is very slight, and, furthermore, one in which the parts are so arranged and adapted that the parts will not wear unduly and become loose.

The invention has for its further object to provide a mounting which when viewed from the front will not differ materially in appearance from the ordinary saddle bridge used on spectacles, with the exception that the guards for grasping the nose may show but to a very slight degree.

Heretofore, bar bridges for eyeglasses have been constructed on the general lines of old-fashioned spring bridges, that is to say, the connecting portion between the lenses has usually been composed of two or more relatively movable bars located some distance above the centers of the lenses and encircled by a spring or springs which cause their relative movement and the approach of the lenses and the nose guards thereon. By reason of the fact that this point of connection was so far above the center of the lenses, and of the general familiarity of the public with eyeglasses which open by a vertical movement of the lenses, there was a tendency on the part of the user to tip the lenses upwardly to apply them, or even if one attempted to move the lenses in line with each other the leverage between the parts would be such as to cause a transverse movement of the bars relatively to their bearings wearing the latter unduly so that they would soon become loose or cause the parts to become bent and inoperative. Such mountings were furthermore unsightly in that a large number of relatively-movable parts were exposed over the wearer's nose, and which parts were required to be relatively strong and heavy in order to withstand the strain to which they were subjected in applying them, but all these objections are overcome in a marked degree by forming the connecting bar or bridge of rigid material and locating the sliding connections or bearings as nearly as possible in line with the centers of the lenses and preferably by making the bridge low so that it may either just clear or rest upon the bridge of the nose of the wearer, if desired. The appearance of the mounting is also enhanced by arranging the connections preferably in rear of the plane of the lenses so that they will not be visible from the front.

To these and other ends the invention consists in certain improvements and combinations of parts, all as will be hereinafter more fully explained, the novel features being pointed out in the claims at the end of the specification.

In the accompanying drawing: Figure 1 is a front elevation of a pair of eyeglasses embodying my improvements. Fig. 2 is a rear elevation of the same. Fig. 3 is a longitudinal horizontal, sectional view taken through one end of the bridge and attaching parts, and showing the other in elevation. Fig. 4 is a vertical, sectional view on the line *y—y* of Fig. 1.

Similar reference numerals in the several figures indicate similar parts.

The lenses indicated by 1 are of the usual or any preferred shape and are preferably frameless,—that is, at the proximate edges of the lenses there are provided attaching devices, indicated by 2, and in the form of the usual studs or clamping posts having one or more ears 3 to which the lenses are secured by screws 4 passing through apertures therein. At the inner proximate ends of the studs are formed the usual or any preferred form of boxes for receiving the shank 5 of the spring nose guards 6, which latter may also be of the usual or any preferred construction, but preferably vertically extending and arranged in substantially the same horizontal plane as the studs, the studs as shown being in a plane intermediate of the ends or bearing portions of the guards, the parts or pads 7 of the guard being above the stud and the bearing parts 8 below it.

9 indicates the bar or bridge connecting the lenses formed of relatively rigid material preferably having its central portion arched slightly upwardly and forwardly, in order to extend either in proximity to the bridge of the wearer's nose, or to rest upon the same if desired, the ends of this bridge extending horizontally in rear of the lenses below their upper and above their lower edges and preferably substantially in the plane of the major axes of the lenses and in line with the clips or attaching devices and the guards, and having a movable connection with the latter whereby the lenses and the attached guards may be moved relatively to each other, and in a horizontal direction only. In order to form an inexpensive connection between these parts and at the same time to adapt this form of bridge to attaching devices or clips or studs of the usual construction, I provide brackets 10 having the tongues 11 projecting laterally through apertures in the rear portions of the studs so that said tongues may be secured beneath or with the shanks of the guard by the securing screws 12. These brackets 10 have at their inner sides apertures, preferably angular, through which the correspondingly-shaped portions of the bridge 9 are passed, and are also provided with the outwardly-extending guides 13 preferably in rear of the studs and with which coöperate the perforated plates 14 formed upon or secured to the outer ends of the bridge.

15 indicates springs encircling the ends of the bridge and arranged between the inner sides of the bracket and the outer plates or heads 14 and serving normally to press the lenses and guards inwardly, holding the latter firmly in engagement with the wearer's nose, and when the mounting is not in use the lower sides of the arch of the bridge limit the inward movement of the lenses, or this might be accomplished by heads on the outer ends of the guide pins 13 if desired.

The operation and manner of applying the glasses to the wearer's nose will be understood by one skilled in the art, a lateral movement relatively of the lenses only being necessary to apply them, and the tension of the springs causing them to be held firmly in place.

The ends of the bridge extend outwardly beyond the point where they are guided on the arm or bracket 10 and beyond the inner edges of the lenses which affords a long bearing enabling mountings of this construction to be worn by persons having relatively short pupilary distances. On the other hand this construction enables the mountings to be used by persons having a wide pupilary distance by employing longer studs or posts.

The principal feature of the invention is the provision of a relatively-movable connection between the bridge and the lenses between the upper and lower edges of the latter and as nearly as possible in line with the horizontal axes of the lenses so that as the operator grasps each of the lenses at top and bottom to separate them, there will be no leverage exerted tending to wear the bearings unduly either above or below or by twisting, and thus loosen the sliding connection, and any slight twisting due to wear being near the optical axes of the lenses will not cause distortion. Theoretically, the proper place for the bearings would be in the centers of the lenses or where the major and minor axes cross, but as this is impossible they are arranged as close to the rear faces of the lenses as practical and in substantially the same horizontal plane as the guards, so as to reduce the opportunity for vertical flexing of the bridge either in opening the glasses or by reason of pressure on the wearer's nose. It is immaterial so far as this arrangement of the bearings is concerned whether the specific form of connection shown is employed or not, but I prefer it for the reason that the device is simple and may be readily applied to studs or attaching devices not essentially different from those now in use, and for the reason that the parts are not visible from the front, thereby enhancing the appearance of the mounting. By having the central portion of the bridge clear of operating parts and providing the connections with the lenses at the ends thereof, I am enabled to bring it into close proximity to the wearer's nose and by forming it of a single part or member, (preferably though not necessarily of one piece of metal) having two portions *i. e.* the arch and the attaching ends in different horizontal planes, the connection with lenses is brought low and the bridge may rest upon the wearer's nose if desired. Also the rigid arch portion reduces the liability of twisting or bending the parts if the attempt is made to move the lenses vertically.

Of course the invention is not limited to making both lenses movable but when so constructed the mounting is more symmetrical and is more readily adaptable to persons having different facial characteristics.

I claim as my invention:

1. In eyeglasses, the combination with the lenses, attaching devices thereon arranged at their proximate edges and nose guards, of a bridge, a movable connection between one end of the bridge and one of the attaching devices arranged substantially in alinement with the major axes of the lenses and extending outwardly beyond the inner edge of the proximate lens, and a spring for resisting the separation of the lenses.

2. In eyeglasses, the combination with the lenses, attaching devices thereon arranged at their proximate edges and nose guards connected to the lenses, of a bridge, a sliding connection between one end of the bridge and the proximate attaching device, located in rear of the face of the lens and outwardly beyond its inner edge and a spring for resisting the separation of the lenses.

3. In eyeglasses, the combination with the lenses, attaching devices and nose guards thereon, of a bridge, horizontal sliding connections between one of said attaching devices and the bridge, and located in a horizontal plane between the upper and the lower ends of the guards, and a spring for causing the relative movements of the lenses toward each other.

4. In eyeglasses, the combination with the lenses, attaching devices and vertically-extending nose guards thereon, of a bridge, horizontally-extending guiding connections between said attaching devices and the bridge located in a horizontal plane between the upper and lower ends of the guards, and a spring for causing the movement of the lenses toward each other.

5. In eyeglasses, the combination with the lenses, attaching devices and nose guards thereon, of a bridge having sliding engagement at its ends with the attaching devices, and springs engaging said devices and the bridge and tending to move the lenses toward each other, the ends of the bridge being in substantial horizontal alinement with each other and with the guards and below the upper edges of the lenses.

6. In eyeglasses, the combination with the lenses, the attaching devices at the proximate edges and below the upper edges thereof, and the nose guards, of the bridge having its ends in substantially the same horizontal plane as the attaching devices, one of said ends having a sliding connection with an attaching device and a spring engaging an attaching device and the bridge for moving the lenses toward each other.

7. In eyeglasses, the combination with the lenses, the attaching devices at the proximate edges thereof and the nose guards, of the bridge having its ends located in rear of the attaching devices and in substantially the same horizontal plane, one of said ends having a sliding connection with an attaching device and a spring engaging said attaching device and the bridge, for moving the lenses toward each other.

8. In eyeglasses, the combination with the lenses, the attaching devices at the proximate edges thereof and the guards, of the bridge provided with the central arched portion and the horizontally-extending ends, the latter having sliding connections with the attaching devices and springs engaging said bridge and attaching devices for moving the lenses toward each other.

9. In eyeglasses, the combination with the lenses, the studs at the proximate edges thereof and the nose guards, of the bridge having horizontal sliding connections between its ends and the studs located in substantially the same horizontal plane as the latter, and springs arranged between the bridge and studs for moving the lenses toward each other.

10. In eyeglasses, the combination with the lenses, the studs, the guides thereon arranged in substantially the same horizontal plane as the studs, and the nose guards, of the bridge having the central arched portion and engaging at its ends the guides on the studs and springs arranged between the bridge ends and studs for moving the lenses toward each other.

11. In eyeglasses, the combination with the lenses, the studs extending inwardly from the edges of the lenses, the guides on the studs and arranged in substantially the same horizontal plane as the latter and the nose guards, of the bridge having sliding connections with the guides on the studs and springs arranged between the bridge and studs for moving the lenses toward each other.

12. In eyeglasses, the combination with the lenses, the studs secured to the proximate edges of the lenses and having outwardly-extending guides thereon located in substantially the same horizontal plane as the studs and the nose guards secured to the studs, of the bridge having the arched central portion, the laterally-extending portions coöperating with the guides and the heads at the ends, and the springs located between the heads on the bridge ends and the studs.

13. In an eyeglass mounting, the combination with studs each having an ear for engaging a lens, guides thereon arranged in substantially the same horizontal plane and nose guards mounted on the studs, of a bridge coöperating at its ends with the guides on the studs and springs coöperating with the bridge and studs to draw the latter toward each other.

14. In eyeglasses, the combination with the lenses, attaching devices thereon arranged at their proximate edges and nose guards, of a bridge having an end connected by a sliding connection with one of the lenses.

15. In eyeglasses, the combination with the lenses, attaching devices thereon arranged at their proximate edges and nose guards, of a bridge, a sliding connection between one end of the bridge and one of the attaching devices and arranged substantially in the plane of the major axes of the lenses and between the upper and lower ends of the guards, and a spring for causing the relative movements of the lenses toward each other.

16. In eyeglasses, the combination with a rigid bridge, of the lenses and nose guards, said lenses being movable longitudinally of the bridge, and the points of connection between them located in substantially the plane of the optical axes of the lenses, and a spring for causing the relative movements of the lens and bridge.

17. In eyeglasses, the combination with the lenses, and the noseguards rigidly secured thereto, of a rigid arched connecting bridge having sliding connections at its ends with the lenses, said sliding connections being located in a horizontal plane between the upper and the lower ends of the noseguards.

18. In eyeglasses, the combination with the lenses and the noseguards rigidly connected thereto, of a bridge arched at the center having sliding connections between its lower ends and the lenses arranged substantially in line with the major axes of the lenses.

19. In eyeglasses, the combination with the lenses and the noseguards secured to and movable bodily with the lenses, of a rigid bridge provided with portions thereof arranged in different horizontal planes, a sliding connection between the lower portion of the bridge and one of the lenses, and a spring resisting the movement of said lens and its guard.

20. In eyeglasses, the combination with the lenses and noseguards connected thereto, of a rigid connecting bridge having the lower horizontal ends and horizontal guides on the lenses with which said ends coöperate located substantially in the plane of the optical centers of the lenses and out of line with the edges of the lenses and independent springs tending to move the lenses toward each other.

21. In eyeglasses, the combination with the lenses, attaching devices at their edges and noseguards connected thereto, of a rigid bridge having the guiding ends extending outwardly beyond the inner edges of the lenses, substantially in line with the attaching devices and having a sliding connection with the latter and springs tending to move the lenses toward each other.

22. In eyeglasses, the combination with a rigid arched bridge having horizontally extending ends and the abutments of connecting members or parts provided with guides for the ends of the bridge and having laterally extending attaching portions and springs arranged between said member and the bridge and pressing the members toward each other.

23. In eyeglasses, the combination with the lenses, the studs thereon, the connecting members secured to the studs having the rearwardly extending portions and the outwardly extending guides, of the bridge having the outwardly extending ends arranged substantially in the same horizontal plane as the studs and operating in the guides and springs arranged between the outer portions of the bridge and the connecting members for holding the lenses pressed yieldingly toward each other.

24. In eyeglasses, the combination with the lenses, the studs thereon and the guards secured to the studs, of the connecting members removably secured to the studs and extending laterally thereof, the bridge having the outwardly extending end arranged substantially in the same horizontal plane as the studs and having sliding engagement with the members, and helical springs encircling the ends of the bridge and engaging the connecting members and serving to hold the lenses pressed yieldingly toward each other.

25. In eyeglasses, the combination with the lenses, studs thereon and noseguards, of a bridge having horizontally extending guiding portions arranged in substantially the same horizontal plane with the studs, a connecting portion having a sliding connection with the guiding portions of the bridge and provided with a horizontally extending attaching arm adapted to be detachably secured to the said stud, and means for holding the noseguards in proximated position.

26. In eyeglasses, the combination with the lenses, studs thereon provided with attaching boxes and noseguards having portions secured in the boxes of the respective studs, of a bridge having a horizontally extending guiding portion arranged in substantially the same horizontal plane with the stud, a connecting portion having a sliding connection with the said guiding portion of the bridge and having an attaching arm extending into the box of the respective stud on one of the lenses and a spring for operating the lens relatively to the bridge.

27. In eyeglasses, the combination with the lenses and noseguards mounted thereon and movable bodily therewith, of a bridge having a horizontal guiding portion arranged substantially in alinement with the major geometrical axes of the lenses and extending outwardly beyond the inner edge thereof, and a sliding connection coöperating with said guiding portion and movable with its respective lens.

28. In eyeglasses, the combination with the lenses having studs overlapping the inner lens edge, and noseguards, of a bridge having a horizontal guiding portion arranged in substantially the same horizontal plane with one of said studs and extending outwardly in rear of the lens-overlapping portion of said stud, and a sliding connection between said stud and the guiding portion of the bridge.

29. In eyeglasses, the combination with the lenses, having studs thereon, and the noseguards, of a bridge having a horizontal guiding portion arranged in substantially the same horizontal plane with said studs, a sliding connection movable with one of the lenses and coöperating with said guiding portion on the bridge, and a helical spring having its axis extending parallel to the guiding portion of the bridge and coöperating with the latter and the sliding connection for producing a proximating movement of the lenses.

30. In eyeglasses, the combination with the lenses, and the noseguards, of a bridge having a horizontal guiding portion arranged substantially in alinement with the major axes of the lenses, a connection movable with one of the lenses and having a guiding portion extending outwardly parallel to the guiding portion of the bridge, and a helical spring encircling one of said guiding portions and coöperating with portions of the bridge and connections for producing relative proximating movement of the lenses.

31. The combination with a rigid bridge provided at its ends with horizontal guides in line with each other, of lens-clamps supported and arranged to slide on said guides, lenses supported by said clamps with their horizontal axes in the same plane with said guides and nose-guards carried by said clamps.

32. The combination with a curved rigid bridge-piece adapted to fit the nose of the wearer, and provided at its ends with horizontal guides in line with each other, of lens-clamps supported and arranged to slide on said guides, nose-guards carried by said clamps, and springs tending to move said lens-clamps and nose-guards toward each other.

33. The combination with a suitable bridge-piece provided at its ends with guides arranged in line with each other, of lens-clamps mounted and adapted to slide on said guides, lenses supported by said clamps with their horizontal axes in the same horizontal plane with said guides, nose-guards carried by said lens-clamps, and springs tending to move said lens-clamps and nose-guards toward each other.

LEO F. ADT.

Witnesses:
MICHAEL F. O'CONNOR,
EDWARD MURPHY, 2d.